(12) United States Patent
Jang et al.

(10) Patent No.: US 12,536,164 B1
(45) Date of Patent: Jan. 27, 2026

(54) METHOD FOR PROVIDING SERVICE BY ARTIFICIAL INTELLIGENCE AGENT WITH MULTI-TURN AND ARTIFICIAL INTELLIGENCE AGENT USING THE SAME

(71) Applicant: SUPERB AI CO., LTD., Seoul (KR)

(72) Inventors: Taewoong Jang, Seoul (KR); Kye Hyeon Kim, Seoul (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 19/313,546

(22) Filed: Aug. 28, 2025

(30) Foreign Application Priority Data

Aug. 11, 2025 (KR) .......................... 10-2025-0110925

(51) Int. Cl.
 *G06F 16/242* (2019.01)
 *G06F 16/245* (2019.01)
 *G06F 40/186* (2020.01)
 *G06F 40/40* (2020.01)

(52) U.S. Cl.
 CPC ........ *G06F 16/245* (2019.01); *G06F 16/2425* (2019.01); *G06F 40/186* (2020.01); *G06F 40/40* (2020.01)

(58) Field of Classification Search
 CPC ............................ G06F 16/2425; G06F 16/243
 See application file for complete search history.

(56) References Cited

U.S. PATENT DOCUMENTS

| 12,393,621 B2* | 8/2025 | Mansour ................. G06F 40/20 |
| 2022/0405483 A1* | 12/2022 | Ho ........................ G06F 40/289 |
| 2024/0412720 A1 | 12/2024 | Vasylyev | |

FOREIGN PATENT DOCUMENTS

| JP | 2025522519 A | 7/2025 |
| KR | 101881744 B1 | 7/2018 |
| KR | 10-2019-0103928 A | 9/2019 |
| KR | 10-2023-0152447 A | 11/2023 |

OTHER PUBLICATIONS

Korean Office Action dated Nov. 10, 2025 as received in application No. 10-2025-0110925.
Shen et al. "HuggingGPT: Solving AI Tasks with ChatGPT and its Friends in Hugging Face" 2023.

* cited by examiner

*Primary Examiner* — Kimberly L Wilson
*Assistant Examiner* — Nirav K Khakhar
(74) *Attorney, Agent, or Firm* — Maschoff Brennan

(57) ABSTRACT

There is provided a method for providing a service by an artificial intelligence(AI) agent with a multi-turn. A cost for performing tasks of an AI agent is reduced and a speed of performing the tasks is improved by maintaining only messages for the most recent j turns as originals and using summary message for each of messages of previous turns of the most recent j turns. Further, a risk of information loss in a multi-turn of the AI agent is eliminated by storing original messages corresponding to the summary messages in an external storage and thus allowing the original messages to be accessed when necessary.

10 Claims, 7 Drawing Sheets

FIG. 3

2100 turn 1

{"role": "user", "content": "What's the temperature in San Francisco now? How about tomorrow? Current Date: 2024-09-30."}, {"role": "assistant", "content": "", "reasoning_content": "Okay, the user is asking for the current temperature in San Francisco and the temperature for tomorrow. Let me check the available tools.\\n\\nFirst, there's the get_current_temperature function. It requires the location and optionally the unit. Since the user didn't specify the unit, I'll default to celsius. The location should be \\\"San Francisco, State, Country\\\". Wait, the example format is \\\"City, State, Country\\\", but San Francisco is a city in California, USA. So the location parameter would be \\\"San Francisco, California, United States\\\".\\n\\nThen, for tomorrow's temperature, the user mentioned the current date is 2024-09-30, so tomorrow would be 2024-10-01. The get_temperature_date function requires location, date, and unit. Again, using the same location and default unit. I need to format the date as \\\"Year-Month-Day\\\", which is 2024-10-01.\\n\\nWait, the current date given is 2024-09-30. If today is September 30, then tomorrow is October 1st. So the date parameter for the second function call should be \\\"2024-10-01\\\".\\n\\nI should make two separate function calls: one for the current temperature and another for tomorrow's date. Let me structure the JSON for both tool calls accordingly."}, {"role": "assistant", "content": "", "function_call": {"name": "get_current_temperature", "arguments": "{\\\"location\\\": \\\"San Francisco, California, United States\\\", \\\"unit\\\": \\\"celsius\\\"}"}}, {"role": "assistant", "content": "", "function_call": {"name": "get_temperature_date", "arguments": "{\\\"location\\\": \\\"San Francisco, California, United States\\\", \\\"date\\\": \\\"2024-10-01\\\", \\\"unit\\\": \\\"celsius\\\"}"}}, {"role": "function", "name": "get_current_temperature", "content": {"temperature": 26.1, "location": "San Francisco, California, United States", "unit": "celsius"}}, {"role": "function", "name": "get_temperature_date", "content": {"temperature": 25.9, "location": "San Francisco, California, United States", "date": "2024-10-01", "unit": "celsius"}}, {"role": "assistant", "content": "..."}

FIG. 4A

2100 turn 1
{"role": "user", "content": "What's the temperature in San Francisco now? How about tomorrow? Current Date: 2024-09-30."},
{"role": "assistant", "content": "", "reasoning_content": "Okay, the user is asking for the current temperature in San Francisco and the temperature for tomorrow. Let me check the available tools.\n\nFirst, there's the get_current_temperature function. It requires the location and optionally the unit. Since the user didn't specify the unit, I'll default to celsius. The location should be \"San Francisco, State, Country\". Wait, the example format is \"City, State, Country\". \n\nThen, for tomorrow's temperature, the user mentioned the current date is 2024-09-30, so tomorrow would be 2024-10-01. The get_temperature_date function requires location, date, and unit. Again, using the same location and default unit. I need to format the date as \"Year-Month-Day\", which is 2024-10-01.\n\nWait, the current date given is 2024-09-30. If today is September 30, then tomorrow is October 1st. So the date parameter for the second function call should be \"2024-10-01\".\n\nI should make two separate function calls: one for the current temperature and another for tomorrow's date. Let me structure the JSON for both tool calls accordingly."},
{"role": "assistant", "content": "", "function_call": {"name": "get_current_temperature", "arguments": "{\"location\": \"San Francisco, California, United States\", \"unit\": \"celsius\"}"}},
{"role": "assistant", "content": "", "function_call": {"name": "get_temperature_date", "arguments": "{\"location\": \"San Francisco, California, United States\", \"date\": \"2024-10-01\", \"unit\": \"celsius\"}"}},
{"role": "function", "name": "get_current_temperature", "content": "{\"temperature\": 26.1, \"location\": \"San Francisco, California, United States\", \"unit\": \"celsius\"}"},
{"role": "function", "name": "get_temperature_date", "content": "{\"temperature\": 25.9, \"location\": \"San Francisco, California, United States\", \"date\": \"2024-10-01\", \"unit\": \"celsius\"}"},
{"role": "assistant", "content": "....."}

2200 turn 2
{"role": "user", "content": "What's the temperature in San Francisco now? How about tomorrow? Current Date: 2024-09-30."},
{"role": "assistant", "content": "", "reasoning_content": "Okay, the user is asking for the current temperature in San Francisco and the temperature for tomorrow. Let me check the available tools.\n\nFirst, there's the get_current_temperature function. It requires the location and optionally the unit. Since the user didn't specify the unit, I'll default to celsius. The location should be \"San Francisco, State, Country\". Wait, the example format is \"City, State, Country\", but San Francisco is a city in California, USA. So the location parameter would be \"San Francisco, California, USA\".\n\nThen, for tomorrow's temperature, the user mentioned the current date is 2024-09-30, so tomorrow would be 2024-10-01. The get_temperature_date function requires location, date, and unit. Again, using the same location and default unit. I need to format the date as \"Year-Month-Day\", which is 2024-10-01.\n\nWait, the current date given is 2024-09-30. If today is September 30, then tomorrow is October 1st. So the date parameter for the second function call should be \"2024-10-01\".\n\nI should make two separate function calls: one for the current temperature and another for tomorrow's date. Let me structure the JSON for both tool calls accordingly."},
{"role": "assistant", "content": "", "function_call": {"name": "get_current_temperature", "arguments": "{\"location\": \"San Francisco, California, United States\", \"unit\": \"celsius\"}"}},
{"role": "assistant", "content": "", "function_call": {"name": "get_temperature_date", "arguments": "{\"location\": \"San Francisco, California, United States\", \"date\": \"2024-10-01\", \"unit\": \"celsius\"}"}},
{"role": "function", "name": "get_current_temperature", "content": "{\"temperature\": 26.1, \"location\": \"San Francisco, California, United States\", \"unit\": \"celsius\"}"},
{"role": "function", "name": "get_temperature_date", "content": "{\"temperature\": 25.9, \"location\": \"San Francisco, California, United States\", \"date\": \"2024-10-01\", \"unit\": \"celsius\"}"},
{"role": "assistant", "content": "....."}

FIG. 4B turn 1:
{"role": "user", "content": {"index": 0, "summary": "chat_summary", "content": {"summary": "user asked about temperature ... and you answered successfully."}}, turn 2
{"role": "user", "content": "What's the temperature in San Francisco now? How about tomorrow? Current Date: 2024-09-30."},
{"role": "assistant", "content": "", "reasoning_content": "Okay, the user is asking for the current temperature in San Francisco and the temperature for tomorrow. Let me check the available tools.\n\nFirst, there's the get_current_temperature function. It requires the location and optionally the unit. Since the user didn't specify the unit, I'll default to celsius. The location should be \"San Francisco, State, Country\".\n\nThen, for tomorrow's temperature, the user mentioned the current date is 2024-09-30, but San Francisco is a city in California, USA. So the location parameter would be \"San Francisco, California, United States\".\n\nThen, for tomorrow's temperature, the user mentioned the current date is 2024-09-30, so tomorrow would be 2024-10-01. The get_temperature_date function requires location, date, and unit. Again, using the same location and default unit. I need to format the date as \"Year-Month-Day\", which is 2024-10-01.\n\nWait, the current date given is 2024-09-30. If today is September 30, then tomorrow is October 1st. So the date parameter for the second function call should be \"2024-10-01\".\n\nI should make two separate function calls: one for the current temperature and another for tomorrow's date. Let me structure the JSON for both tool calls accordingly."},
{"role": "assistant", "content": "", "function_call": {"name": "get_current_temperature", "arguments": "{\"location\": \"San Francisco, California, United States\", \"unit\": \"celsius\"}"}},
{"role": "assistant", "content": "", "function_call": {"name": "get_temperature_date", "arguments": "{\"location\": \"San Francisco, California, United States\", \"date\": \"2024-10-01\", \"unit\": \"celsius\"}"}},
{"role": "function", "name": "get_current_temperature", "content": {"temperature": 26.1, "location": "San Francisco, California, United States", "unit": "celsius"}},
{"role": "function", "name": "get_temperature_date", "content": {"temperature": 25.9, "location": "San Francisco, California, United States", "date": "2024-10-01", "unit": "celsius"}},
{"role": "assistant", "content": "..."}

FIG. 5A turn 1:
{"role": "chat_summary", "content": {"index": 0, "summary": "user asked about temperature ... and you answered successfully."}}, turn 2
{"role": "user", "content": "What's the temperature in San Francisco now? How about tomorrow? Current Date: 2024-09-30."},
{"role": "assistant", "content": "", "reasoning_content": "Okay, the user is asking for the current temperature in San Francisco and the temperature for tomorrow. Let me check the available tools.\n\nFirst, there's the get_current_temperature function. It requires the location and optionally the unit. Since the user didn't specify the unit, I'll default to celsius. The location should be \"San Francisco, State, Country\"\n\nSan Francisco, California, United States\".\n\nThen, for tomorrow's temperature, the user mentioned the current date is 2024-09-30, so tomorrow would be 2024-10-01. The get_temperature_date function requires location, date, and unit. Again, using the same location and default unit. I need to format the date as \"Year-Month-Day\", which is 2024-10-01.\n\nWait, the current date given is 2024-09-30. If today is September 30, then tomorrow is October 1st. So the date parameter for the second function call should be \"2024-10-01\".\n\nI should make two separate function calls: one for the current temperature and another for tomorrow's date. Let me structure the JSON for both tool calls accordingly."},
{"role": "assistant", "content": "", "function_call": {"name": "get_current_temperature", "arguments": "{\"location\": \"San Francisco, California, United States\", \"unit\": \"celsius\"}"}},
{"role": "assistant", "content": "", "function_call": {"name": "get_temperature_date", "arguments": "{\"location\": \"San Francisco, California, United States\", \"date\": \"2024-10-01\", \"unit\": \"celsius\"}"}},
{"role": "function", "name": "get_current_temperature", "content": {"temperature": 26.1, "location": "San Francisco, California, United States", "unit": "celsius"}},
{"role": "function", "name": "get_temperature_date", "content": {"temperature": 25.9, "location": "San Francisco, California, United States", "date": "2024-10-01", "unit": "celsius"}},
{"role": "assistant", "content": "..."} turn 3
{"role": "user", "content": "Based on the first chat, should I wear a thick jacket if I'm in San Francisco?"},
{"role": "assistant", "content": "", "function_call": {"name": "get_chat_log", "arguments": "{\"index\": 0}"}},
{"role": "function", "name": "get_chat_log", "content": "...turn 1의 message(2000) list json..."},
{"role": "assistant", "content": "Based on the first chat, you should not wear a thick jacket."}

FIG. 5B turn 1:
{"role": "chat_summary", "content": {"index": 0, "summary": "user asked about temperature ... and you answered successfully."}}, turn 2:
{"role": "chat_summary", "content": {"index": 1, "summary": "user asked about temperature ... and you answered successfully."}}, turn 3
{"role": "user", "content": "Based on the first chat, should I wear a thick jacket if I'm in San Francisco?"},
{"role": "assistant", "content": "Based on the first chat, you should not wear a thick jacket."}

METHOD FOR PROVIDING SERVICE BY ARTIFICIAL INTELLIGENCE AGENT WITH MULTI-TURN AND ARTIFICIAL INTELLIGENCE AGENT USING THE SAME

CROSS REFERENCE TO RELATED APPLICATION

This application claims the benefit of priority to Korean Patent Application No. 10-2025-0110925, filed on Aug. 11, 2025, the entire contents of which being incorporated herein by reference.

FIELD OF THE DISCLOSURE

The present disclosure relates to an AI (Artificial Intelligence) agent, and more specifically, to a method for providing a service by the AI agent with multi-turn and the AI agent using the same

BACKGROUND OF THE DISCLOSURE

An AI agent is an intelligent software system that can solve complex problems without an intervention of a user, make situational judgments, and perform tasks by using various tools such as a database, a web search, coding and the like to achieve goals.

The AI agent is also being utilized in various fields, for example, a customer service such as chatbots or virtual assistants, a business automation such as automating repetitive tasks or analyzing data, an industrial automation such as robot control or process optimization, personal assistants such as scheduling or organizing emails, a healthcare such as diagnosing diseases or establishing treatment plans, and an R&D such as experimental design or data analysis.

In these AI agents, rather than a single-turn method that ends with one question and one answer, a multi-turn method that can provide accurate and satisfactory answers by repeating questions and answers is widely used. In the multi-turn method, messages corresponding to questions and answers of previous turns are stored in a chat history, and a task of a current turn is performed by using the stored messages of the previous turns and questions of the current turn.

In case of using the multi-turn like this, there are various restrictions as the number of the turns increases. For example, there are problems such as the length of the message inputted to an LLM (Large Language Model) to perform the current turn exceeding a set context length, or a cost of calling the LLM increasing due to the increase in input tokens. In particular, in case the AI agent tries to acquire an answer the user wants to a question from a database, as a data exploration task progresses, a length of messages exchanged between the user and the AI agent increases rapidly, which increases the cost and latency required for the AI agent to perform the task.

To address this issue, conventional approaches summarize messages from previous turns and use these summaries to execute the current turn. This enables the AI agent to execute the multi-turn while maintaining the context of the entire message even as the number of turns increases.

However, using the summaries of the previous messages in this way can lead to a loss of important details during a summarization process, thereby making it difficult to generate an accurate response that the user desires.

Additionally, in case the AI agent wants to acquire the answer to the user's desired question from the database, there is a problem that the data exploration task to acquire the corresponding data from the database must be repeatedly performed because the data acquired through the data exploration task in previous turns may not be included in the summary.

SUMMARY OF THE DISCLOSURE

It is an object of the present disclosure to solve all the aforementioned problems.

It is another object of the present disclosure to reduce a cost for performing tasks of an AI agent and improve a speed of performing the tasks by maintaining only messages for the most recent j turns as originals and using summary message for each of messages of previous turns of the most recent j turns.

It is still another object of the present disclosure to eliminate a risk of information loss in a multi-turn of the AI agent by storing original messages corresponding to the summary messages in an external storage and thus allowing the original messages to be accessed when necessary.

It is still yet another object of the present disclosure to minimize a data exploration task of the AI agent by acquiring data from the stored original messages corresponding to the summary messages instead of acquiring them from a database through the data exploration task even when the data used in previous turns are needed.

The characteristic configurations of the present disclosure for achieving the object of the present disclosure as described above are as follows.

In accordance with one aspect of the present disclosure, there is provided a method for providing a service by an artificial intelligence (AI) agent with a multi-turn, comprising: (a) in response to acquiring a p-th query for requesting a p-th service from a user, wherein the p is an integer that increases sequentially from 1 to j, and wherein the j is a preset integer greater than or equal to 1, repeatedly performing, by the AI agent, a p-th turn including sub-processes of: (1) analyzing the p-th query and a first original message to a (p−1)-th original message stored in a chat history, or analyzing only the p-th query when the p is 1, to thereby determine a p-th task for providing the p-th service, (2) acquiring p-th data required to provide the p-th service from at least one database according to the p-th task, (3) generating a p-th response corresponding to the p-th query by using the p-th data and thus providing the p-th response to the user, and then (4) storing a p-th original message in the chat history, wherein the p-th original message includes (i) p-th query information for the p-th query, (ii) p-th agent operation information for a sub-process of analyzing the p-th query and the first original message to the (p−1)-th original message to determine the p-th task and a sub-process of generating the p-th response by using the p-th data, and (iii) p-th response information for the p-th response; (b) in response to acquiring a (j+1)-th query for requesting a (j+1)-th service from the user, performing, by the AI agent, a (j+1)-th turn including sub-processes of: (1) analyzing the (j+1)-th query and the first original message to a j-th original message stored in the chat history, to thereby determine a (j+1)-th task for providing the (j+1)-th service, (2) acquiring (j+1)-th data required to provide the (j+1)-th service from at least one database according to the (j+1)-th task, (3) generating a (j+1)-th response corresponding to the (j+1)-th query by using the (j+1)-th data and thus providing the (j+1)-th response to the user, (4) storing a (j+1)-th original message in the chat history, to thereby generate a first summary message corresponding to the first original message stored in the chat history, (5) storing the first original message to an external storage, and then (6) updating the first original message stored in the chat history with the first summary message, wherein the (j+1)-th original message includes (i) (j+1)-th query information for the (j+1)-th query, (ii) (j+1)-th agent operation information for a sub-process of analyzing the (j+1)-th query and the first original message to the j-th original message to determine the (j+1)-th task and a sub-process of generating the (j+1)-th response by using the (j+1)-th data, and (iii) (j+1)-th response information for the (j+1)-th response, and wherein the first summary message includes at least a summary of the first query information and the first response information; and (c) in response to acquiring a k-th query for requesting a k-th service from the user, wherein the k is an integer that increases sequentially from j+2, repeatedly performing, by the AI agent, a k-th turn including sub-processes of: (1) analyzing the k-th query, the first summary message to a (k−j−1)-th summary message stored in the chat history, and a (k−j)-th original message to a (k−1)-th original message stored in the chat history, to thereby determine a k-th task for providing the k-th service, (2) acquiring k-th data required to provide the k-th service from at least one database according to the k-th task, (3) generating a k-th response corresponding to the k-th query by using the k-th data and thus providing the k-th response to the user, (4) storing a k-th original message in the chat history, to thereby generate a (k−j)-th summary message corresponding to the (k−j)-th original message stored in the chat history, (5) storing the (k−j)-th original message to the external storage, and then (6) updating the (k−j)-th original message stored in the chat history with the (k−j)-th summary message, wherein the k-th original message includes (i) k-th query information for the k-th query, (ii) k-th agent operation information for a sub-process of analyzing the k-th query, the first summary message to the (k−j−1)-th summary message and the (k−j)-th original message to the (k−1)-th original message to determine the k-th task and a sub-process of generating the k-th response by using the k-th data, and (iii) k-th response information for the k-th response, and wherein the (k−j)-th summary message includes at least a summary of the (k−j)-th query information and the (k−j)-th response information.

As one example, at the step of (c), in response to determining that at least one specific data corresponding to at least one specific summary message among the first summary message to the (k−j−1)-th summary message is required to generate the k-th response, the AI agent acquires at least one specific original message corresponding to the at least one specific summary message stored in the external storage, and acquires the at least one specific data included in the at least one specific original message, to thereby generate the k-th response by using the at least one specific data acquired from the at least one specific original message.

As one example, in case of storing, in the chat history, the k-th original message including the k-th query information, the k-th agent operation information and the k-th response information, the AI agent deletes k-th agent sub-operation information from the k-th agent operation information and then stores, in the chat history, the k-th agent operation information with the k-th agent sub-operation information deleted, wherein the k-th agent sub-operation information indicates sub-processes of acquiring the at least one specific original message corresponding to the at least one specific summary message stored in the external storage and acquiring the at least one specific data included in the at least one specific original message.

As one example, in case of storing, in the chat history, the k-th original message including the k-th query information, the k-th agent operation information and the k-th response information, the AI agent adds k-th agent sub-operation information to the k-th agent operation information and then stores, in the chat history, the k-th agent operation information with the k-th agent sub-operation information added, wherein the k-th agent sub-operation information indicates sub-processes of acquiring the at least one specific original message corresponding to the at least one specific summary message stored in the external storage and acquiring the at least one specific data included in the at least one specific original message.

As one example, at the step of (a), the AI agent requests an LLM (Large Language Model) for the p-th service by adding the p-th query and the first original message to the (p−1)-th original message to a preset chat prompt template, to thereby instruct the LLM to perform the p-th turn, wherein, at the step of (b), the AI agent requests the LLM for the (j+1)-th service by adding the (j+1)-th query and the first original message to the j-th original message to the preset chat prompt template, to thereby instruct the LLM to perform the (j+1)-th turn, wherein, at the step of (c), the AI agent requests the LLM for the k-th service by adding the k-th query, the first summary message to the (k−j−1)-th summary message, and the (k−j)-th original message to the (k−1)-th original message to the preset chat prompt template, to thereby instruct the LLM to perform the k-th turn.

In accordance with another aspect of the present disclosure there is provided an artificial intelligence (AI) agent for providing a service with a multi-turn, comprising: at least one memory which saves instructions for providing the service with the multi-turn; and at least one processor configured to execute the operation for providing the service with the multi-turn according to the instructions stored in the memory to perform processes of: (I) in response to acquiring a p-th query for requesting a p-th service from a user, wherein the p is an integer that increases sequentially from 1 to j, and wherein the j is a preset integer greater than or equal to 1, repeatedly performing a p-th turn including sub-processes of: (1) analyzing the p-th query and a first original message to a (p−1)-th original message stored in a chat history, or analyzing only the p-th query when the p is 1, to thereby determine a p-th task for providing the p-th service, (2) acquiring p-th data required to provide the p-th service from at least one database according to the p-th task, (3) generating a p-th response corresponding to the p-th query by using the p-th data and thus providing the p-th response to the user, and then (4) storing a p-th original message in the chat history, wherein the p-th original message includes (i) p-th query information for the p-th query, (ii) p-th agent operation information for a sub-process of analyzing the p-th query and the first original message to the (p−1)-th original message to determine the p-th task and a sub-process of generating the p-th response by using the p-th data, and (iii) p-th response information for the p-th response; (II) in response to acquiring a (j+1)-th query for requesting a (j+1)-th service from the user, performing a (j+1)-th turn including sub-processes of: (1) analyzing the (j+1)-th query and the first original message to a j-th original message stored in the chat history, to thereby determine a (j+1)-th task for providing the (j+1)-th service, (2) acquiring (j+1)-th data required to provide the (j+1)-th service from at least one database according to the (j+1)-th task, (3) generating a (j+1)-th response corresponding to the (j+1)-th query by using the (j+1)-th data and thus providing the (j+1)-th response to the user, (4) storing a (j+1)-th original message in the chat history, to thereby generate a first summary message corresponding to the first original message stored in the chat history, (5) storing the first original message to an external storage, and then (6) updating the first original message stored in the chat history with the first summary message, wherein the (j+1)-th original message includes (i) (j+1)-th query information for the (j+1)-th query, (ii) (j+1)-th agent operation information for a sub-process of analyzing the (j+1)-th query and the first original message to the j-th original message to determine the (j+1)-th task and a sub-process of generating the (j+1)-th response by using the (j+1)-th data, and (iii) (j+1)-th response information for the (j+1)-th response, and wherein the first summary message includes at least a summary of the first query information and the first response information; and (III) in response to acquiring a k-th query for requesting a k-th service from the user, wherein the k is an integer that increases sequentially from j+2, repeatedly performing a k-th turn including sub-processes of: (1) analyzing the k-th query, the first summary message to a (k−j−1)-th summary message stored in the chat history, and a (k−j)-th original message to a (k−1)-th original message stored in the chat history, to thereby determine a k-th task for providing the k-th service, (2) acquiring k-th data required to provide the k-th service from at least one database according to the k-th task, (3) generating a k-th response corresponding to the k-th query by using the k-th data and thus providing the k-th response to the user, (4) storing a k-th original message in the chat history, to thereby generate a (k−j)-th summary message corresponding to the (k−j)-th original message stored in the chat history, (5) storing the (k−j)-th original message to the external storage, and then (6) updating the (k−j)-th original message stored in the chat history with the (k−j)-th summary message, wherein the k-th original message includes (i) k-th query information for the k-th query, (ii) k-th agent operation information for a sub-process of analyzing the k-th query, the first summary message to the (k−j−1)-th summary message and the (k−j)-th original message to the (k−1)-th original message to determine the k-th task and a sub-process of generating the k-th response by using the k-th data, and (iii) k-th response information for the k-th response, and wherein the (k−j)-th summary message includes at least a summary of the (k−j)-th query information and the (k−j)-th response information.

As one example, at the process of (III), in response to determining that at least one specific data corresponding to at least one specific summary message among the first summary message to the (k−j−1)-th summary message is required to generate the k-th response, the processor acquires at least one specific original message corresponding to the at least one specific summary message stored in the external storage, and acquires the at least one specific data included in the at least one specific original message, to thereby generate the k-th response by using the at least one specific data acquired from the at least one specific original message.

As one example, in case of storing, in the chat history, the k-th original message including the k-th query information, the k-th agent operation information and the k-th response information, the processor deletes k-th agent sub-operation information from the k-th agent operation information and then stores, in the chat history, the k-th agent operation information with the k-th agent sub-operation information deleted, wherein the k-th agent sub-operation information indicates sub-processes of acquiring the at least one specific original message corresponding to the at least one specific summary message stored in the external storage and acquiring the at least one specific data included in the at least one specific original message.

As one example, in case of storing, in the chat history, the k-th original message including the k-th query information, the k-th agent operation information and the k-th response information, the processor adds k-th agent sub-operation information to the k-th agent operation information and then stores, in the chat history, the k-th agent operation information with the k-th agent sub-operation information added, wherein the k-th agent sub-operation information indicates sub-processes of acquiring the at least one specific original message corresponding to the at least one specific summary message stored in the external storage and acquiring the at least one specific data included in the at least one specific original message.

As one example, at the process of (I), the processor requests an LLM (Large Language Model) for the p-th service by adding the p-th query and the first original message to the (p−1)-th original message to a preset chat prompt template, to thereby instruct the LLM to perform the p-th turn, wherein, at the process of (II), the processor requests the LLM for the (j+1)-th service by adding the (j+1)-th query and the first original message to the j-th original message to the preset chat prompt template, to thereby instruct the LLM to perform the (j+1)-th turn, wherein, at the process of (III), the processor requests the LLM for the k-th service by adding the k-th query, the first summary message to the (k−j−1)-th summary message, and the (k−j)-th original message to the (k−1)-th original message to the preset chat prompt template, to thereby instruct the LLM to perform the k-th turn.

In addition, in accordance with still another aspect of the present disclosure there is further provided a computer-readable recording medium for recording a computer program for executing the method of the present disclosure.

BRIEF DESCRIPTION OF THE DRAWINGS

The accompanying drawings used to explain example embodiments of the present disclosure are only part of example embodiments of the present disclosure and other drawings may be obtained based on the drawings by those skilled in the art of the present disclosure without inventive work.

FIG. 3 to FIG. 5B are drawings schematically illustrating, as an exemplary scenario, the method for providing the service by the AI agent with the multi-turn in accordance with one example embodiment of the present disclosure.

DETAILED DESCRIPTION OF THE PREFERRED EMBODIMENTS

Figure 1:
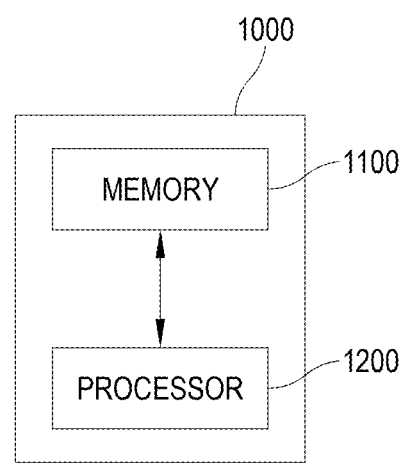
FIG. 1 is a drawing schematically illustrating an AI agent for providing a service with a multi-turn in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically illustrating an AI agent for providing a service with a multi-turn in accordance with one example embodiment of the present disclosure. By referring to FIG. 1, the AI agent 1000 may include a memory 1100 in which instructions for providing the service with the multi-turn are stored, and a processor 1200 for executing operations of providing the service with the multi-turn according to the instructions stored in the memory 1100.

Specifically, the AI agent 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processor 1200 of the AI agent 1000 may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the AI agent 1000 including an integrated processor which is an integrated form of the medium, the processor, and the memory for performing the present disclosure.

Meanwhile, in response to acquiring a p-th query for requesting a p-th service from a user, wherein the p is an integer that increases sequentially from 1 to j, the processor 1200 of the AI agent 1000 may execute the instructions saved in the memory 1100 to repeatedly perform a p-th turn including sub-processes of: (1) analyzing the p-th query and a first original message to a (p−1)-th original message stored in a chat history, to thereby determine a p-th task for providing the p-th service, (2) acquiring p-th data required to provide the p-th service from at least one database according to the p-th task, (3) generating a p-th response corresponding to the p-th query by using the p-th data and thus providing the p-th response to the user, and (4) storing a p-th original message in the chat history. Herein, the j is a preset integer greater than or equal to 1, and a first task may be determined by analyzing only the p-th query when the p is 1. Herein, the p-th original message may include (i) p-th query information for the p-th query, (ii) p-th agent operation information for a sub-process of analyzing the p-th query and the first original message to the (p−1)-th original message to determine the p-th task and a sub-process of generating the p-th response by using the p-th data, and (iii) p-th response information for the p-th response.

Thereafter, in response to acquiring a (j+1)-th query for requesting a (j+1)-th service from the user, the processor 1200 of the AI agent 1000 may execute the instructions saved in the memory 1100 to perform a (j+1)-th turn including sub-processes of: (1) analyzing the (j+1)-th query and the first original message to a j-th original message stored in the chat history, to thereby determine a (j+1)-th task for providing the (j+1)-th service, (2) acquiring (j+1)-th data required to provide the (j+1)-th service from at least one database according to the (j+1)-th task, (3) generating a (j+1)-th response corresponding to the (j+1)-th query by using the (j+1)-th data and thus providing the (j+1)-th response to the user, (4) storing a (j+1)-th original message in the chat history, to thereby generate a first summary message corresponding to the first original message stored in the chat history, (5) storing the first original message to an external storage, and then (6) updating the first original message stored in the chat history with the first summary message.

Herein, the (j+1)-th original message may include (i) (j+1)-th query information for the (j+1)-th query, (ii) (j+1)-th agent operation information for a sub-process of analyzing the (j+1)-th query and the first original message to the j-th original message to determine the (j+1)-th task and a sub-process of generating the (j+1)-th response by using the (j+1)-th data, and (iii) (j+1)-th response information for the (j+1)-th response.

Also, the first summary message may include at least a summary of first query information and first response information. Thereafter, in response to acquiring a k-th query for requesting a k-th service from the user, wherein the k is an integer that increases sequentially from j+2, the processor 1200 of the AI agent 1000 may execute the instructions saved in the memory 1100 to repeatedly perform a k-th turn including sub-processes of: (1) analyzing the k-th query, the first summary message to a (k−j−1)-th summary message stored in the chat history, and a (k−j)-th original message to a (k−1)-th original message stored in the chat history, to thereby determine a k-th task for providing the k-th service, (2) acquiring k-th data required to provide the k-th service from at least one database according to the k-th task, (3) generating a k-th response corresponding to the k-th query by using the k-th data and thus providing the k-th response to the user, (4) storing a k-th original message in the chat history, to thereby generate a (k−j)-th summary message corresponding to the (k−j)-th original message stored in the chat history, (5) storing the (k−j)-th original message to the external storage, and then (6) updating the (k−j)-th original message stored in the chat history with the (k−j)-th summary message.

Herein, the (k−j)-th summary message may include at least a summary of (k−j)-th query information and (k−j)-th response information.

Also, the k-th original message may include (i) k-th query information for the k-th query, (ii) k-th agent operation information for a sub-process of analyzing the k-th query, the first summary message to the (k−j−1)-th summary message and the (k−j)-th original message to the (k−1)-th original message to determine the k-th task and a sub-process of generating the k-th response by using the k-th data, and (iii) k-th response information for the k-th response.

Figure 2:
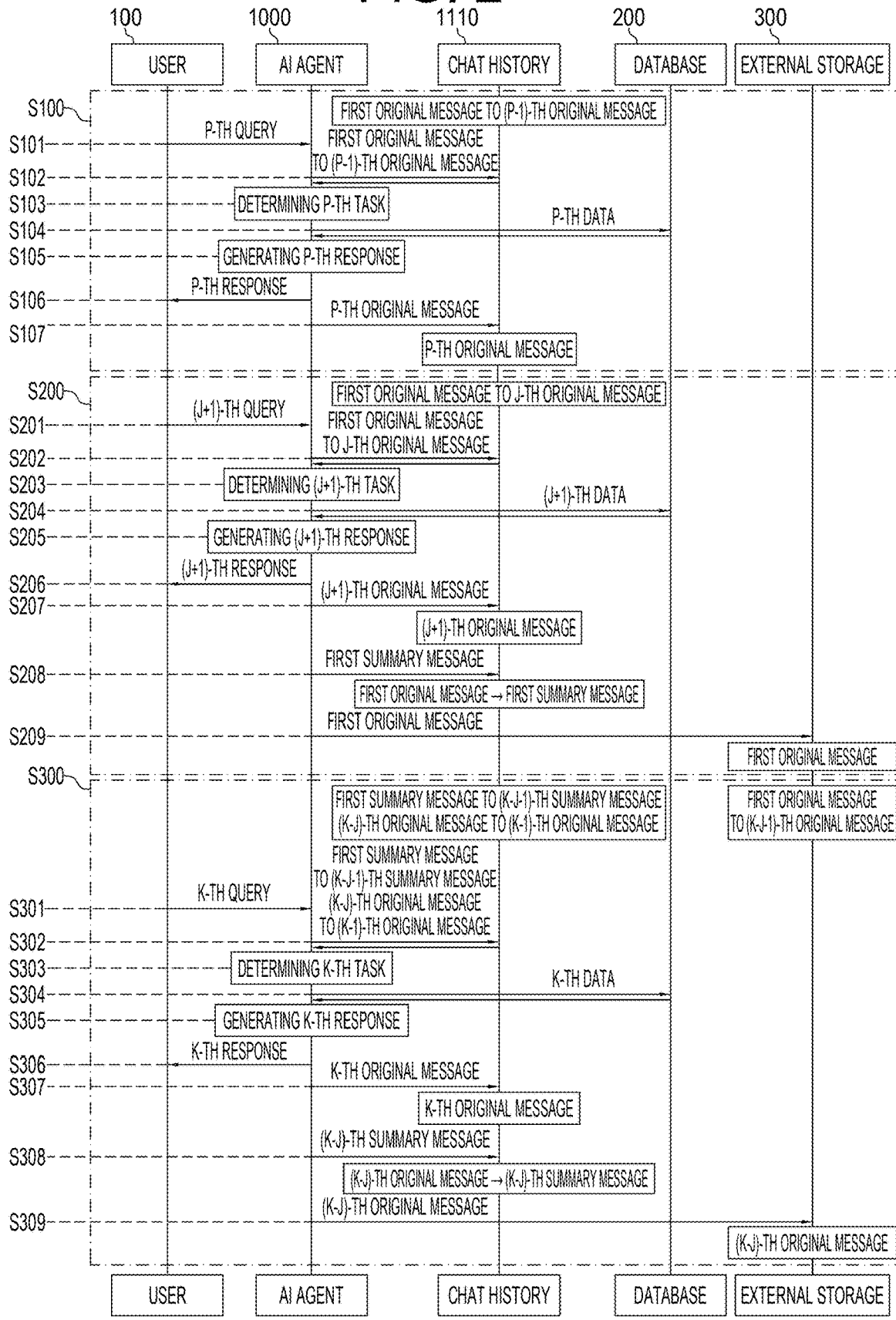
FIG. 2 is a drawing schematically illustrating a method for providing the service by the AI agent with the multi-turn in accordance with one example embodiment of the present disclosure.

The method of providing the service using multi-turn with the AI agent 1000 configured in this manner is described in more detail by referring to FIG. 2 as follows.

First, the AI agent 1000 may repeatedly perform the p-th turn at a step of S100 including sub-processes of: providing the p-th response for the p-th query which is acquired from the user 100, i.e., a user terminal, and storing the p-th original message in the chat history 1110, wherein the p is the integer that increases sequentially from 1 to j. Herein, the j may be a preset integer greater than or equal to 1. Also, in case of using summary messages and original messages of previous turns stored in the chat history 1110 in the current turn, j is the number of the original messages to be used, and the j original messages may correspond to most recent j turns, i.e., the most recent j previous turns.

Specifically, for the p as the integer that increases sequentially from 1 to j, in response to acquiring the p-th query for requesting the p-th service from the user 100 at a step of S101, the AI agent 1000 may acquire the first original message to the (p−1)-th original message stored in the chat history 1110 at a step of S102, and determine the p-th task for providing the p-th service by analyzing the p-th query and the first original message to the (p−1)-th original message at a step of S103. Meanwhile, in case the p is 1, i.e., when it is the first turn in the multi-turn, there is no original message stored in the chat history 1110, so the AI agent 1000 may determine the first task by using only the first query.

Herein, the AI agent 1000 may request the LLM for the p-th service by adding the first original message to the (p−1)-th original message acquired from the chat history 1110 to a preset chat prompt template and by additionally adding the p-th query inputted by the user to the preset chat prompt template, that is, the AI agent 1000 may call the LLM through the preset chat prompt template with the p-th query and the first original message to the (p−1)-th original message added, to thereby instruct the LLM to determine the p-th task.

Then, the AI agent 1000 may acquire the p-th data required to provide the p-th service from at least one database 200 according to the determined p-th task at a step of S104.

Thereafter, the AI agent 1000 may generate the p-th response corresponding to the p-th query by using the p-th data at a step of S105, and thus provide the generated p-th response to the user at a step of S106.

Also, the AI agent 1000 may store the p-th original message in the chat history 1110 at a step of S107. Herein, the p-th original message may include (i) the p-th query information for the p-th query, (ii) the p-th agent operation information for the sub-process of analyzing the p-th query and the first original message to the (p−1)-th original message to determine the p-th task and the sub-process of generating the p-th response by using the p-th data, and (iii) the p-th response information for the p-th response.

When the process proceeds from the first turn to the j-th turn in the same manner as above, the first original message to the j-th original message may be stored in the chat history 1110.

Next, the AI agent 1000 may perform the (j+1)-th turn at a step of S200 including sub-processes of: providing the (j+1)-th response for the (j+1)-th query acquired from the user, storing the (j+1)-th original message in the chat history 1110, generating the first summary message corresponding to the first original message stored in the chat history 1110, storing the first original message in an external storage 300, and then updating the first original message stored in the chat history 1110 with the first summary message. Herein, the first summary message may include at least a summary of the first query information and the first response information.

Specifically, with the first original message to the j-th original message stored in the chat history 1110, in response to acquiring the (j+1)-th query for requesting the (j+1)-th service from the user 100 at a step of S201, the AI agent 1000 may acquire the first original message to the j-th original message stored in the chat history 1110 at a step of S202, and determine the (j+1)-th task for providing the (j+1)-th service by analyzing the (j+1)-th query and the first original message to the k-th original message at a step of S203.

Herein, the AI agent 1000 may request the LLM for the (j+1)-th service by adding the first original message to the j-th original message acquired from the chat history 1110 to the preset chat prompt template and by additionally adding the (j+1)-query inputted by the user to the preset chat prompt template, that is, the AI agent 1000 may call the LLM through the preset chat prompt template with the (j+1)-th query and the first original message to the j-th original message added, to thereby instruct the LLM to determine the (j+1)-th task.

Then, the AI agent 1000 may acquire the (j+1)-th data required to provide the (j+1)-th service from the at least one database 200 according to the determined (j+1)-th task at a step of S204.

Thereafter, the AI agent 1000 may generate the (j+1)-th response corresponding to the (j+1)-th query by using the (j+1)-th data at a step of S205, and thus provide the generated (j+1)-th response to the user at a step of S206.

Also, the AI agent 1000 may store the (j+1)-th original message in the chat history 1110 at a step of S207. Herein, the (j+1)-th original message may include (i) the (j+1)-th query information for the (j+1)-th query, (ii) the (j+1)-th agent operation information for the sub-process of analyzing the (j+1)-th query and the first original message to the j-th original message to determine the (j+1)-th task and the sub-process of generating the (j+1)-th response by using the (j+1)-th data, and (iii) the (j+1)-th response information for the (j+1)-th response.

In addition, after generating the first summary message corresponding to the first original message stored in the chat history 1110, the AI agent 1000 may update the first original message stored in the chat history 1110 with the first summary message at a step of S208, and store the first original message in the external storage 300 at a step of S209.

Herein, the AI agent 1000 may input the first original message into the LLM to thereby instruct the LLM to generate the first summary message which is a result of summarizing the first original message. Herein, the first summary message may include at least a summary of the first query information and the first response information.

When the process proceeds the (j+1)-th turn in the same manner as above, the first summary message and the second original message to the p-th original message may be stored in the chat history 1110, and the first original message may be stored in the external storage 300.

Next, the AI agent 1000 may perform the k-th turn at a step of S300 including sub-processes of: providing the k-th response for the k-th query acquired from the user 100, storing the k-th original message in the chat history 1110, generating the (k−j)-th summary message corresponding to the (k−j)-th original message stored in the chat history 1110, storing the (k−j)-th original message in the external storage 300, and then updating the (k−j)-th original message stored in the chat history 1110 with the (k−j)-th summary message, wherein the k is an integer that increases sequentially from j+2. Herein, the (k−j)-th summary message may include at least a summary of the (k−j)-th query information and the (k−j)-th response information.

Specifically, with the first summary message to the (k−j−1)-th summary message and the (k−j)-th original message to the (k−1)-th original message stored in the chat history 1110, and with the first original message to the (k−j−1)-th original message stored in the external storage 300, for the k as an integer that increases sequentially from j+2, in response to acquiring the k-th query for requesting the k-th service from the user 100 at a step of S301, the AI agent 1000 may acquire the first summary message to the (k−j−1)-th summary message and the (k−j)-th original message to the (k−1)-th original message stored in the chat history 1110 at a step of S302, and determine the k-th task for providing the k-th service by analyzing the k-th query, the first summary message to the (k−j−1)-th summary message, and the (k−j)-th original message to the (k−1)-th original message at a step of S303.

Herein, the AI agent 1000 may request the LLM for the k-th service by adding the first summary message to the (k−j−1)-th summary message and the (k−j)-th original message to the (k−1)-th original message acquired from the chat history 1110 to the preset chat prompt template and by additionally adding the k-th query inputted by the user to the preset chat prompt template, that is, the AI agent 1000 may call the LLM through the preset chat prompt template with the k-th query, the first summary message to the (k−j−1)-th summary message, and the (k−j)-th original message to the (k−1)-th original message added, to thereby instruct the LLM to determine the k-th task.

Then, the AI agent 1000 may acquire the k-th data required to provide the k-th service from the at least one database 200 according to the determined k-th task at a step of S304.

Thereafter, the AI agent 1000 may generate the k-th response corresponding to the k-th query by using the k-th data at a step of S305, and thus provide the generated k-th response to the user 100 at a step of S306.

Also, the AI agent 1000 may store the k-th original message in the chat history 1110 at a step of S307. Herein, the k-th original message may include (i) k-th query information for the k-th query, (ii) k-th agent operation information for a sub-process of analyzing the k-th query, the first summary message to the (k−j−1)-th summary message and the (k−j)-th original message to the (k−1)-th original message to determine the k-th task and a sub-process of generating the k-th response by using the k-th data, and (iii) k-th response information for the k-th response.

In addition, after generating the (k−j)-th summary message corresponding to the (k−j)-th original message stored in the chat history 1110, the AI agent 1000 may update the (k−j)-th original message in the chat history 1110 with the (k−j)-th summary message at a step of S308, and store the (k−j)-th original message in the external storage 300 at a step of S309.

Herein, the AI agent 1000 may input the (k−j)-th original message into the LLM to thereby instruct the LLM to generate the (k−j)-th summary message which is a result of summarizing the (k−j)-th original message. Herein, the (k−j)-th summary message may include at least a summary of the (k−j)-th query information and the (k−j)-th response information.

Meanwhile, while repeatedly performing the k-th turn, in response to determining that at least one specific data corresponding to at least one specific summary message among the first summary message to the (k−j−1)-th summary message is required to generate the k-th response, the AI agent 1000 acquires at least one specific original message corresponding to the at least one specific summary message stored in the external storage 300, and acquires the at least one specific data included in the at least one specific original message, to thereby generate the k-th response by using the at least one specific data acquired from the at least one specific original message.

Herein, in case of storing, in the chat history 1110, the k-th original message including the k-th query information, the k-th agent operation information and the k-th response information, the AI agent 1000 deletes k-th agent sub-operation information from the k-th agent operation information and then stores, in the chat history 1110, the k-th agent operation information with the k-th agent sub-operation information deleted. Herein, the k-th agent sub-operation information indicates sub-processes of acquiring the at least one specific original message corresponding to the at least one specific summary message stored in the external storage 300 and acquiring the at least one specific data included in the at least one specific original message.

In contrast, in case of storing, in the chat history 1110, the k-th original message including the k-th query information, the k-th agent operation information and the k-th response information, the AI agent 1000 adds the k-th agent sub-operation information to the k-th agent operation information and then stores, in the chat history 1110, the k-th agent operation information with the k-th agent sub-operation information added.

The method for providing the service by the AI agent 1000 with the multi-turn according to the present invention as described above is briefly described below by using the exemplary scenarios of FIG. 3 to FIG. 5B. For reference, the scenarios below assume that the service is provided by using one original message from the turn immediately preceding the current turn.

First, FIG. 3 exemplarily illustrates a first original message 2100 stored in the chat history after a first turn in which the user inquired about temperatures of today and tomorrow in 'San Francisco' and an AI agent provided a response thereto.

By referring to FIG. 3, the first original message 2100 may include first query information 2110, first agent operation information 2121, 2122, and first response information 2130.

According to the first query information 2110 of the first original message 2100, the user requested the temperatures of today and tomorrow in 'San Francisco' on Sep. 30, 2024.

In addition, according to the first agent operation information 2121, 2122 of the first original message 2100, the AI agent analyzes the first query of the user to determine a location parameter of 'San Francisco' and exact date parameters of today and tomorrow requested by the user based on Sep. 30, 2024. Then, the AI agent determines the first task to acquire the temperatures of today and tomorrow in 'San Francisco' from the database at a step of 2121, and obtains first data, i.e., the temperatures of today and tomorrow in 'San Francisco', from the database according to the determined first task at a step of 2122.

Furthermore, according to the first response information 2130 of the first original message 2100, the AI agent provides a first response to the user by using the first data.

Next, FIG. 4A schematically illustrates a state in which a second response is provided in response to a second query of the user in a second turn. For reference, it is assumed that the second turn contains the same query and response as the first turn for comparison with a summary message.

According to FIG. 4A, in response to the input of the second query from the user, the AI agent determines a second task by analyzing the first original message 2100 and the second query, obtains second data from the database according to the second task, generates the second response by using the second data to provide it to the user, and then stores a second original message 2200 in the chat history.

Thereafter, by referring to FIG. 4B, the AI agent stores the first original message stored in the chat history to an external storage, then summarizes the first original message to create a first summary message 2100', and updates the first original message stored in the chat history with the first summary message 2100'.

Next, by referring to FIG. 5A, in response to an input of a third query asking about a result of the first turn from the user, the AI agent analyzes the first summary message 2100', the second original message 220 and the third query to determine a third task. According to the third task, the AI agent performs a third agent sub-operation to acquire the first data of the first turn by acquiring the first original message, i.e., the message 2000 from the first turn, stored in the external storage in response to the first summary message 2100', and provides third response information for the third query by using the first data, i.e., the temperatures of today and tomorrow in 'San Francisco', acquired according to the third agent sub-operation.

Thereafter, by referring to FIG. 5B, the AI agent updates the second original message stored in the chat history with a second summary message 2200'. Furthermore, a third original message 2300 is stored in the chat history with the third agent sub-operation information 2320 deleted from the third original message 2300 of FIG. 5A.

Meanwhile, unlike FIG. 5B where the third original message is stored in the chat history with the third agent sub-operation information 2320 deleted, the third original message with the third agent sub-operation information 2320 added can be stored in the chat history in its original form by referring to FIG. 5A.

The present disclosure has an effect of reducing the cost for performing tasks of the AI agent and improve the speed of performing the tasks by maintaining only the messages for the most recent j turns as originals and using summary message for each of the messages of previous turns of the most recent j turns.

The present disclosure has another effect of eliminating the risk of information loss in multi-turn of the AI agent by storing original messages corresponding to the summary messages in the external storage and thus allowing the original messages to be accessed when necessary.

The present disclosure has still another effect of minimizing the data exploration task of the AI agent by acquiring data from the stored original messages corresponding to the summary messages instead of acquiring them from the database through the data exploration task even when the data used in previous turns are needed.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing a service by an artificial intelligence (AI) agent with a multi-turn, comprising:
   (a) in response to acquiring a p-th query for requesting a p-th service from a user, wherein the p is an integer that increases sequentially from 1 to j, and wherein the j is a preset integer greater than or equal to 1, repeatedly performing, by the AI agent, a p-th turn including sub-processes of: (1) analyzing the p-th query and a first original message to a (p−1)-th original message stored in a chat history, or analyzing only the p-th query when the p is 1, to thereby determine a p-th task for providing the p-th service, (2) acquiring p-th data required to provide the p-th service from at least one database according to the p-th task, (3) generating a p-th response corresponding to the p-th query by using the p-th data and thus providing the p-th response to the user, and then (4) storing a p-th original message in the chat history, wherein the p-th original message includes (i) p-th query information for the p-th query, (ii) p-th agent operation information for a sub-process of analyzing the p-th query and the first original message to the (p−1)-th original message to determine the p-th task and a sub-process of generating the p-th response by using the p-th data, and (iii) p-th response information for the p-th response;
   (b) in response to acquiring a (j+1)-th query for requesting a (j+1)-th service from the user, performing, by the AI agent, a (j+1)-th turn including sub-processes of: (1) analyzing the (j+1)-th query and the first original message to a j-th original message stored in the chat history, to thereby determine a (j+1)-th task for providing the (j+1)-th service, (2) acquiring (j+1)-th data required to provide the (j+1)-th service from at least one database according to the (j+1)-th task, (3) generating a (j+1)-th response corresponding to the (j+1)-th query by using the (j+1)-th data and thus providing the (j+1)-th response to the user, (4) storing a (j+1)-th original message in the chat history, to thereby generate a first summary message corresponding to the first original message stored in the chat history, (5) storing the first original message to an external storage, and then (6) updating the first original message stored in the chat history with the first summary message, wherein the (j+1)-th original message includes (i) (j+1)-th query information for the (j+1)-th query, (ii) (j+1)-th agent operation information for a sub-process of analyzing the (j+1)-th query and the first original message to the j-th original message to determine the (j+1)-th task and a sub-process of generating the (j+1)-th response by using the (j+1)-th data, and (iii) (j+1)-th response information for the (j+1)-th response, and wherein the first summary message includes at least a summary of the first query information and the first response information; and (c) in response to acquiring a k-th query for requesting a k-th service from the user, wherein the k is an integer that increases sequentially from j+2, repeatedly performing, by the AI agent, a k-th turn including sub-processes of: (1) analyzing the k-th query, the first summary message to a (k−j−1)-th summary message stored in the chat history, and a (k−j)-th original message to a (k−1)-th original message stored in the chat history, to thereby determine a k-th task for providing the k-th service, (2) acquiring k-th data required to provide the k-th service from at least one database according to the k-th task, (3) generating a k-th response corresponding to the k-th query by using the k-th data and thus providing the k-th response to the user, (4) storing a k-th original message in the chat history, to thereby generate a (k−j)-th summary message corresponding to the (k−j)-th original message stored in the chat history, (5) storing the (k−j)-th original message to the external storage, and then (6) updating the (k−j)-th original message stored in the chat history with the (k−j)-th summary message, wherein the k-th original message includes (i) k-th query information for the k-th query, (ii) k-th agent operation information for a sub-process of analyzing the k-th query, the first summary message to the (k−j−1)-th summary message and the (k−j)-th original message to the (k−1)-th original message to determine the k-th task and a sub-process of generating the k-th response by using the k-th data, and (iii) k-th response information for the k-th response, and wherein the (k−j)-th summary message includes at least a summary of the (k−j)-th query information and the (k−j)-th response information.

2. The method of claim 1, wherein, at the step of (c), in response to determining that at least one specific data corresponding to at least one specific summary message among the first summary message to the (k−j−1)-th summary message is required to generate the k-th response, the AI agent acquires at least one specific original message corresponding to the at least one specific summary message stored in the external storage, and acquires the at least one specific data included in the at least one specific original message, to thereby generate the k-th response by using the at least one specific data acquired from the at least one specific original message.

3. The method of claim 2, wherein, in case of storing, in the chat history, the k-th original message including the k-th query information, the k-th agent operation information and the k-th response information, the AI agent deletes k-th agent sub-operation information from the k-th agent operation information and then stores, in the chat history, the k-th agent operation information with the k-th agent sub-operation information deleted, wherein the k-th agent sub-operation information indicates sub-processes of acquiring the at least one specific original message corresponding to the at least one specific summary message stored in the external storage and acquiring the at least one specific data included in the at least one specific original message.

4. The method of claim 2, in case of storing, in the chat history, the k-th original message including the k-th query information, the k-th agent operation information and the k-th response information, the AI agent adds k-th agent sub-operation information to the k-th agent operation information and then stores, in the chat history, the k-th agent operation information with the k-th agent sub-operation information added, wherein the k-th agent sub-operation information indicates sub-processes of acquiring the at least one specific original message corresponding to the at least one specific summary message stored in the external storage and acquiring the at least one specific data included in the at least one specific original message.

5. The method of claim 1, wherein, at the step of (a), the AI agent requests an LLM (Large Language Model) for the p-th service by adding the p-th query and the first original message to the (p−1)-th original message to a preset chat prompt template, to thereby instruct the LLM to perform the p-th turn, wherein, at the step of (b), the AI agent requests the LLM for the (j+1)-th service by adding the (j+1)-th query and the first original message to the j-th original message to the preset chat prompt template, to thereby instruct the LLM to perform the (j+1)-th turn, wherein, at the step of (c), the AI agent requests the LLM for the k-th service by adding the k-th query, the first summary message to the (k−j−1)-th summary message, and the (k−j)-th original message to the (k−1)-th original message to the preset chat prompt template, to thereby instruct the LLM to perform the k-th turn.

6. An artificial intelligence (AI) agent for providing a service with a multi-turn, comprising:

at least one memory which saves instructions for providing the service with the multi-turn; and at least one processor configured to execute operations for providing the service with the multi-turn according to the instructions stored in the memory to perform processes of: (I) in response to acquiring a p-th query for requesting a p-th service from a user, wherein the p is an integer that increases sequentially from 1 to j, and wherein the j is a preset integer greater than or equal to 1, repeatedly performing a p-th turn including sub-processes of: (1) analyzing the p-th query and a first original message to a (p−1)-th original message stored in a chat history, or analyzing only the p-th query when the p is 1, to thereby determine a p-th task for providing the p-th service, (2) acquiring p-th data required to provide the p-th service from at least one database according to the p-th task, (3) generating a p-th response corresponding to the p-th query by using the p-th data and thus providing the p-th response to the user, and then (4) storing a p-th original message in the chat history, wherein the p-th original message includes (i) p-th query information for the p-th query, (ii) p-th agent operation information for a sub-process of analyzing the p-th query and the first original message to the (p−1)-th original message to determine the p-th task and a sub-process of generating the p-th response by using the p-th data, and (iii) p-th response information for the p-th response; (II) in response to acquiring a (j+1)-th query for requesting a (j+1)-th service from the user, performing a (j+1)-th turn including sub-processes of: (1) analyzing the (j+1)-th query and the first original message to a j-th original message stored in the chat history, to thereby determine a (j+1)-th task for providing the (j+1)-th service, (2) acquiring (j+1)-th data required to provide the (j+1)-th service from at least one database according to the (j+1)-th task, (3) generating a (j+1)-th response corresponding to the (j+1)-th query by using the (j+1)-th data and thus providing the (j+1)-th response to the user, (4) storing a (j+1)-th original message in the chat history, to thereby generate a first summary message corresponding to the first original message stored in the chat history, (5) storing the first original message to an external storage, and then (6) updating the first original message stored in the chat history with the first summary message, wherein the (j+1)-th original message includes (i) (j+1)-th query information for the (j+1)-th query, (ii) (j+1)-th agent operation information for a sub-process of analyzing the (j+1)-th query and the first original message to the j-th original message to determine the (j+1)-th task and a sub-process of generating the (j+1)-th response by using the (j+1)-th data, and (iii) (j+1)-th response information for the (j+1)-th response, and wherein the first summary message includes at least a summary of the first query information and the first response information; and (III) in response to acquiring a k-th query for requesting a k-th service from the user, wherein the k is an integer that increases sequentially from j+2, repeatedly performing a k-th turn including sub-processes of: (1) analyzing the k-th query, the first summary message to a (k−j−1)-th summary message stored in the chat history, and a (k−j)-th original message to a (k−1)-th original message stored in the chat history, to thereby determine a k-th task for providing the k-th service, (2) acquiring k-th data required to provide the k-th service from at least one database according to the k-th task, (3) generating a k-th response corresponding to the k-th query by using the k-th data and thus providing the k-th response to the user, (4) storing a k-th original message in the chat history, to thereby generate a (k−j)-th summary message corresponding to the (k−j)-th original message stored in the chat history, (5) storing the (k−j)-th original message to the external storage, and then (6) updating the (k−j)-th original message stored in the chat history with the (k−j)-th summary message, wherein the k-th original message includes (i) k-th query information for the k-th query, (ii) k-th agent operation information for a sub-process of analyzing the k-th query, the first summary message to the (k−j−1)-th summary message and the (k−j)-th original message to the (k−1)-th original message to determine the k-th task and a sub-process of generating the k-th response by using the k-th data, and (iii) k-th response information for the k-th response, and wherein the (k−j)-th summary message includes at least a summary of the (k−j)-th query information and the (k−j)-th response information.

7. The AI agent of claim 6, wherein, at the process of (III), in response to determining that at least one specific data corresponding to at least one specific summary message among the first summary message to the (k−j−1)-th summary message is required to generate the k-th response, the processor acquires at least one specific original message corresponding to the at least one specific summary message stored in the external storage, and acquires the at least one specific data included in the at least one specific original message, to thereby generate the k-th response by using the at least one specific data acquired from the at least one specific original message.

8. The AI agent of claim 7, wherein, in case of storing, in the chat history, the k-th original message including the k-th query information, the k-th agent operation information and the k-th response information, the processor deletes k-th agent sub-operation information from the k-th agent operation information and then stores, in the chat history, the k-th agent operation information with the k-th agent sub-operation information deleted, wherein the k-th agent sub-operation information indicates sub-processes of acquiring the at least one specific original message corresponding to the at least one specific summary message stored in the external storage and acquiring the at least one specific data included in the at least one specific original message.

9. The AI agent of claim 7, in case of storing, in the chat history, the k-th original message including the k-th query information, the k-th agent operation information and the k-th response information, the processor adds k-th agent sub-operation information to the k-th agent operation information and then stores, in the chat history, the k-th agent operation information with the k-th agent sub-operation information added, wherein the k-th agent sub-operation information indicates sub-processes of acquiring the at least one specific original message corresponding to the at least one specific summary message stored in the external storage and acquiring the at least one specific data included in the at least one specific original message.

10. The AI agent of claim 6, wherein, at the process of (I), the processor requests an LLM (Large Language Model) for the p-th service by adding the p-th query and the first original message to the (p−1)-th original message to a preset chat prompt template, to thereby instruct the LLM to perform the p-th turn,
  wherein, at the process of (II), the processor requests the LLM for the (j+1)-th service by adding the (j+1)-th query and the first original message to the j-th original message to the preset chat prompt template, to thereby instruct the LLM to perform the Gj+1)-th turn,
  wherein, at the process of (III), the processor requests the LLM for the k-th service by adding the k-th query, the first summary message to the (k−j−1)-th summary message, and the (k−j)-th original message to the (k−1)-th original message to the preset chat prompt template, to thereby instruct the LLM to perform the k-th turn.

* * * * *